United States Patent [19]

Vickers, III

[11] E Re. 28,537

[45] Reissued Sept. 2, 1975

[54] COMBINED FLASHLIGHT AND CHEMICAL EXPELLING DEVICE

[75] Inventor: Charles W. Vickers, III, Tampa, Fla.

[73] Assignee: Percy Rosenbloom, Jr., Jacksonville, Fla.

[22] Filed: June 22, 1973

[21] Appl. No.: 372,677

Related U.S. Patent Documents

Reissue of:

[64] Patent No.: 3,638,836
Issued: Feb. 1, 1972
Appl. No.: 9,254
Filed: Feb. 4, 1970

U.S. Applications:

[63] Continuation of Ser. No. 757,856, Sept. 6, 1968, abandoned.

[52] U.S. Cl. ..... 222/192; 240/10.66

[51] Int. Cl.[2] ..... B67D 5/06

[58] Field of Search ..... 222/113, 162, 192, 394; 240/10.62 X, 6.4, 2FD, 10.62, 10.66; 222/174, 475, 465

[56] References Cited

UNITED STATES PATENTS

| | | | |
|---|---|---|---|
| 1,299,076 | 4/1919 | Wasylowich | 222/192 X |
| 2,577,857 | 12/1951 | Parisotto | 222/113 |
| 2,597,565 | 5/1952 | Chandler et al. | 240/10.62 X |
| 2,598,357 | 5/1952 | Coleman | 222/113 |
| 2,629,516 | 2/1953 | Badham | 222/113 X |
| 2,755,973 | 7/1956 | Campbell | 222/394 |
| 3,035,738 | 4/1959 | Bloom | 222/113 |
| 3,716,170 | 2/1973 | Mangelo | 222/162 |

*Primary Examiner*—Stanley H. Tollberg
*Assistant Examiner*—Norman L. Stack, Jr.
*Attorney, Agent, or Firm*—George H. Baldwin; Arthur G. Yeager

[57] ABSTRACT

A can of aerosol expelled chemical is combined with a flashlight, and chemical from the can passes through a conduit and out through a dispensing nozzle arranged so that the chemical is dispensed toward the same point on which the flashlight beam impinges. Means are provided for selectively dispensing the chemical from the can.

22 Claims, 3 Drawing Figures

INVENTOR
CHARLES W. VICKERS, III.

BY Kimmel, Crowell & Weaver,
ATTORNEYS

COMBINED FLASHLIGHT AND CHEMICAL EXPELLING DEVICE

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation of my application, Ser. No. 757,856, filed Sept. 6, 1968, now abandoned, entitled RIOT CONTROL ATTACHMENT FOR FLASHLIGHTS.

BACKGROUND OF THE INVENTION

The present invention relates to a combined flashlight and chemical expelling device for supporting an aerosol chemical deterrent dispensing can and more particularly to an attachment for such a flashlight in which a conduit extends parallel to the flashlight and is arranged to dispense the chemical from the aerosol can toward the same point where the beam of the flashlight would illuminate.

SUMMARY OF THE INVENTION

In the prior art use of aerosol expelled chemicals as deterrents the riot control officer would carry an aerosol can in one hand, depressing the dispensing valve with one finger in order to fire a charge of chemical toward a rioter. At night when a flashlight became necessary, the officer held the flashlight in one hand and the aerosol can in the other completely eliminating the possibility of carrying a gun or billy club in hand and ready for use. With the present invention, the officer can hold the combined flashlight and chemical expelling device in one hand while holding the gun or billy club in the other hand ready for instant use.

In accord with the invention an elongated casing means houses a light bulb and focusing beam reflector assembly at a forward end thereof and orients same to forwardly direct a beam of light from the bulb. The casing means includes two chambers with a battery means for illuminating the bulb in one chamber and a pressurized can of chemicals in the other chamber. An elongated conduit has one end disposed in the other chamber and extends forwardly therefrom and terminates in a forwardly directed outlet adjacent the reflector assembly. Manually operable means are provided for dispensing chemicals from the can through the conduit to the outlet.

In accord with other aspects of the invention, the chambers are generally cylindrical and are axially aligned with the casing means also being cylindrical rearwardly of the reflector assembly. Furthermore, the chambers may be releasably connected to permit ready replacement of the can.

The primary object of the invention is to provide a combination flashlight and chemical expelling device which is useful for general illumination and for aiming the charge of chemical deterrent.

Another object of the invention is to provide a device of the class described above which is inexpensive to manufacture, simple to construct and assemble and which will withstand the forces of hard usage.

BRIEF DESCRIPTION OF THE DRAWING

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

DESCRIPTION OF THE PREFERRED EMBODIMENT

Figure 1:
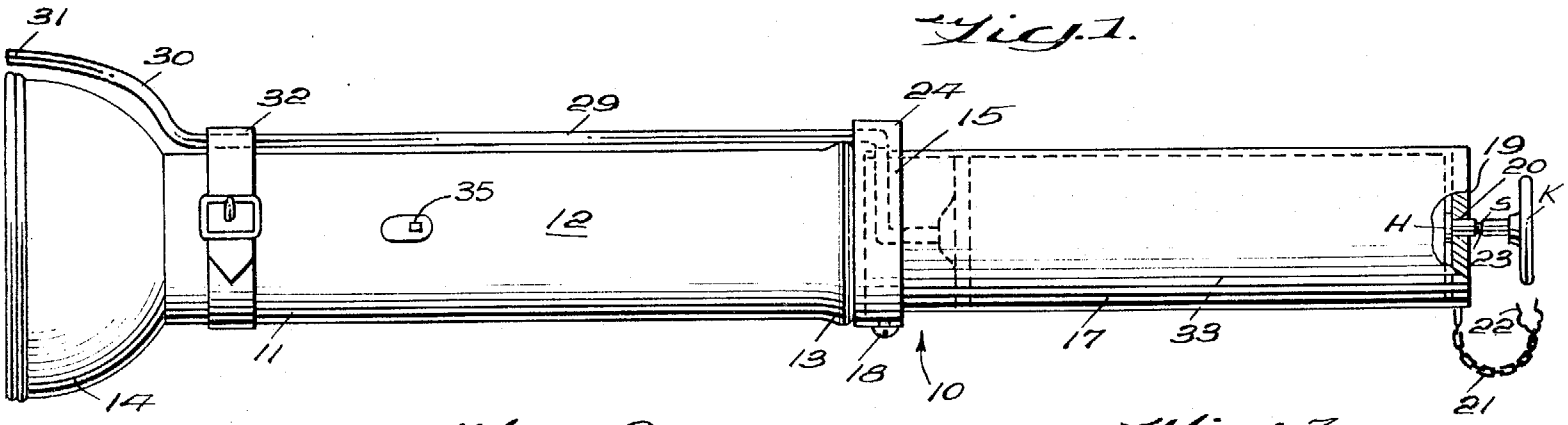
FIG. 1 is a side elevational view of the combined flashlight and chemical expelling device in accord with the invention.
Figure 3:
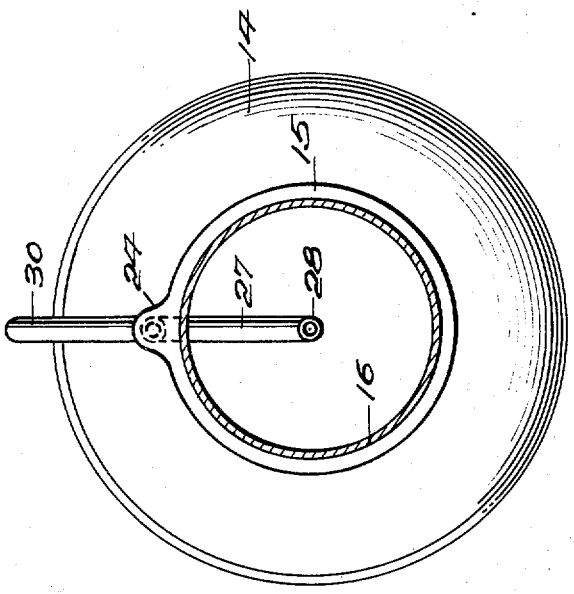
FIG. 3 is a transverse cross-sectional view taken along the line 3—3 of FIG. 2 in the direction of the arrows.

Referring now to the drawings in detail wherein like reference characters indicate like parts throughout the several figures, the reference numeral 10 indicates generally a combined flashlight and chemical expelling device constructed in accordance with the invention.

The combined flashlight and chemical expelling device 10 includes a flashlight 11 having a generally clyindrical elongated battery case 12 terminating in a flared base 13 at one end and a bell-shaped light reflector 14 at the opposite end. The flashlight 11 is of completely conventional design and may be any of the commercially available flashlights of this general nature. *The flashlight 11 includes the normal on-off switch 35 for selectively connecting a light bulb disposed in the light reflector assembly to the batteries, as is well known in the flashlight art.*

Figure 2:
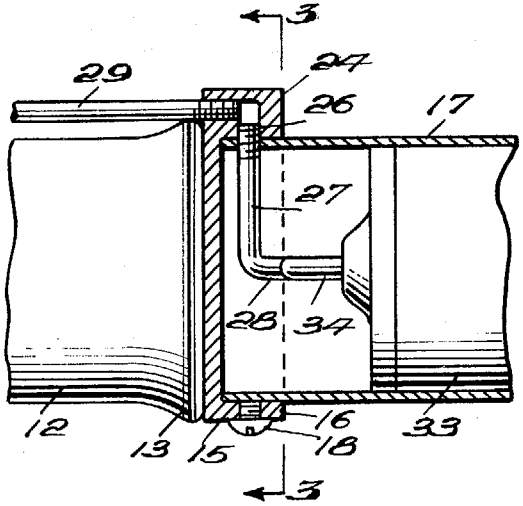
FIG. 2 is an enlarged longitudinal cross-sectional view corresponding to FIG. 1 shown partially broken away.

A generally cylindrical cover 15 is secured to the base 13 by any suitable means including cement, soldering, and detachable screws. The cover 15 has an annular flange 16 extending outwardly away from the base 13 of the flashlight 11 and adapted to telescopically receive a cylindrical container 17 which is secured therein by a setscrew 18 threaded through the flange 16 and engaging against the container 17 as can be best seen in FIG. 2. The container 17 has a closed end 19 opposite the cover 15 with a central bore 20 opening therethrough. An actuator shaft S extends through the bore 20 and is provided with a knob K on its outer end. A head H is formed on the inner end of the shaft S to secure the shaft S against detachment from the closed end 19. A safety chain 21 is secured to the container 17 at one end and to a spring clip 22 at the opposite end to prevent the loss of the spring clip 22. The shaft S has a groove 23 formed therein to receive the spring clip 22 to serve as a safety to prevent inward movement of the shaft S until the spring clip 22 is removed.

A boss 24 is formed on the flange 16 and extends outwardly therefrom having a threaded bore 25 extending therein parallel to the axis of the cover 15 and intersecting a threaded bore 26 extending radially through the flange 16 and boss 24. An L-shaped conduit 27 is threaded into the threaded bore 26 and extends inwardly of the cover 15 terminating in a short portion 28 arranged axially of the cover 15 and opening toward the closed end wall 19 of the container 17. An elongated conduit 29 is threaded into the threaded bore 25 at one end and extends parallel to the flashlight 11. The conduit 29 is bowed outwardly at 30 to be generally parallel to the reflector 14 and terminates in a dispensing nozzle or outlet 31 at its outer end. A flexible strap 32 encompasses the flashlight 11 and the conduit 29 to secure the conduit 29 thereto.

An aerosol can 33 of conventional construction is positioned in the container 17 and has its dispensing valve structure 34 arranged in communication with the conduit 27 so that when the aerosol can 33 is moved toward the conduit 27 the dispensing valve 34 is depressed and pressurized fluid from the can 33 through the conduits 27, 29 and out through the outlet 31. The aerosol can 33 is moved within the container 17 by pressing on the knob K with the actuator shaft S extending through the bore 20 and the head H bearing against the bottom of the can 33.

The aerosol can 33 contains a liquid material which will be dispensed by the aerosol as a deterrent gas. Among liquids useful for this purpose are "mace," a phenylchloromethylketone, manufactured by the General Ordnance Equipment Corporation, Pittsburgh, Pa., or any of the more commonly known tear gases, such as monoethanolamine. In the use and operation of the invention, the riot control officer can aim the flashlight using of course the beam of light therefrom, and when it is necessary to discharge a quantity of deterrent chemical or gas toward the offenders, he can press the knob K against his chest while maintaining the aim of the flashlight by means of the light beam. The riot control officer can carry suitable additional weapons in his other hand ready for instant use when such is necessary.

Complete usage of the liquid in the aerosol container may be achieved from the horizontal position used in this combination by weighting the intake tube within the can so that it will fall to the lower side of the can.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A riot control attachment for flashlights of the type including a cylindrical battery case having a base at one end thereof and a light reflector at the opposite end thereof comprising a container arranged in axial alignment with said battery case, means detachably securing said container to said base, a deterrent-chemical-containing aerosol can mounted in said container, a conduit secured to said flashlight terminating adjacent said reflector, and means for dispensing chemicals from said aerosol can through said conduit.

2. A device as claimed in claim 1 wherein said aerosol can is provided with a dispensing valve and said conduit is arranged in contact with said dispensing valve whereby upon actuation of the means for dispensing chemicals from said aerosol can said chemicals are fed through said conduit.

3. A device as claimed in claim 1 wherein means are provided encompassing said flashlight and said conduit for detachably securing said conduit to said flashlight.

4. A device as claimed in claim 1 wherein the means securing said container to said flashlight includes a cover having an annular flange telescopically receiving said container and means on said flange securing said container thereto.

5. In a combined flashlight and chemical expelling device comprising an elongated casing means for housing a light bulb and focusing beam reflector assembly at a forward end thereof and oriented to forwardly direct a beam of light from said bulb, said casing means including two chambers in end to alignment, battery means for illuminating said bulb in one of said chambers, a pressurized can of chemicals in the other of said chambers, an elongated conduit having one end disposed in said other chamber and extending forwardly therefrom and terminating in a forwardly directed outlet [adjacent said reflector] *at said forward end*, and manually operable means for dispensing chemicals from said can through said conduit to said outlet whereby chemicals are directed generally in the direction of the beam of light.

6. In the device as claimed in claim 5 wherein said casing means further includes means for detachably securing said chambers together.

7. In the device as claimed in claim 5 wherein said casing means rearwardly of said reflector assembly is generally cylindrical with each of said chambers being in axial alignment.

8. In the device as claimed in claim 5 wherein said manually operable means includes a dispensing valve located at the outlet of said can and means exposed outwardly of said casing *means* for selectively operating said dispensing valve.

9. In the device as claimed in claim 5 wherein each, said chambers are cylindrical.

10. In the device as claimed in claim 9 wherein said cylindrical chambers are axially aligned.

*11. A combined chemical ejecting and flashlight device comprising:*

*a casing means for receiving one or more batteries and an aerosol container,*

*said casing means being closed at one end and provided with a light reflector at the other end portion,*

*a light bulb mounted in said reflector and electrically connected through an electric switch to the batteries,*

*an electric switch mounted on the outside of said casing means for selectively connecting the batteries to said light bulb to energize said bulb,*

*chemical discharging means mounted on said reflector other end portion of said casing means to extend outwardly therefrom for discharging fluid under pressure,*

*said chemical discharging means being adapted to receive at one end the tip of the aerosol container when it is moved longitudinally into said chemical discharging means to cause the aerosol container to discharge at least a part of its fluid under pressure through said chemical discharging means outwardly of said device,*

*a triggering switch means mounted on the outside of said casing means for selectively moving the aerosol container into said chemical discharging means for discharging at least a part of its fluid under pressure.*

*12. The combination set forth in claim 11 wherein said casing means receives in axial alignment one or more*

*batteries and the aerosol container and said chemical discharge means comprises a nozzle means.*

*13. The combination set forth in claim 12 wherein said electric switch and triggering switch means are disposed on the outside of said casing means spaced longitudinally of the axis of said casing means.*

*14. The combination set forth in claim 11 wherein said chemical discharge means is mounted on said reflector end to discharge fluid under pressure from the aerosol container within the zone of the rays of light of said bulb.*

*15. The combination set forth in claim 11 wherein said chemical discharge means is mounted on said reflector end to discharge fluid under pressure from the aerosol container in the same direction as the rays of light of said bulb.*

*16. The combination set forth in claim 11 wherein said chemical discharge means comprises a nozzle mounted on said reflector end for discharging fluid under pressure from the aerosol container through the rays of light of said bulb when said bulb is energized and said aerosol container is moved into said discharge means.*

*17. The combination set forth in claim 11 in further combination with an interlocking means mounted on said casing means for prohibiting the movement of said triggering means until moved in a predetermined direction.*

*18. A combined chemical ejecting and flashlight device comprising:*

*a casing means for receiving one or more batteries and an aerosol container having a spring biased discharging tip,*

*said casing means being closed at one end and provided with a light reflector therewithin at the other end portion,*

*a light bulb mounted in said reflector and electrically connected to the batteries,*

*electric switching means mounted on the outside of said casing means for selectively connecting the batteries to said light bulb to energize said bulb,*

*a nozzle means located within said casing means,*

*said casing means including a transparent covering mounted on the front of said reflector,*

*a hollow tube connected to said nozzle means and extending through said casing means,*

*said nozzle means being adapted to receive within said casing means one end of the tip of the aerosol container when it is moved longitudinally into said nozzle means to cause the aerosol container to discharge at least a part of its contents under pressure through said nozzle means, and said hollow tube outwardly of said device,*

*an actuating means mounted on the outside of said casing means for selectively moving the aerosol container into said nozzle means for discharging its contents under pressure,*

*said nozzle means discharging the contents under pressure within the zone of the rays of light of said bulb.*

*19. The combination set forth in claim 18 wherein said casing means is provided for receiving the batteries and aerosol container in axial alignment.*

*20. The combination set forth in claim 19 wherein said transparent covering comprises a lens.*

*21. The combination set forth in claim 18 in further combination with an interlocking means mounted on said casing means for prohibiting the movement of said actuating means until moved in a predetermined direction.*

*22. A combined chemical ejecting and flashlight device comprising:*

*a casing means for receiving one or more batteries and an aerosol container,*

*said casing means being closed at one end and provided with a light reflector at the other end portion,*

*a light bulb mounted in said reflector and electrically connected through an electric switch to the batteries,*

*an electric switch mounted on the outside of said casing means for selectively connecting the batteries to said light bulb to energize said bulb,*

*chemical discharging means mounted on said other end portion of said casing means and extending outwardly of said reflector for discharging fluid under pressure,*

*said chemical discharging means being adapted to receive at one end the tip of the aerosol container when it is moved longitudinally into said chemical discharging means to cause the aerosol container to discharge at least a part of its fluid under pressure through said chemical discharging means outwardly of said flashlight,*

*a triggering switch means mounted on the outside of said casing means for selectively moving the aerosol container into said chemical discharging means for discharging at least a part of its fluid under pressure.*

* * * * *